(No Model.)
G. L. REENSTIERNA.
CHAIN.
No. 566,095. Patented Aug. 18, 1896.
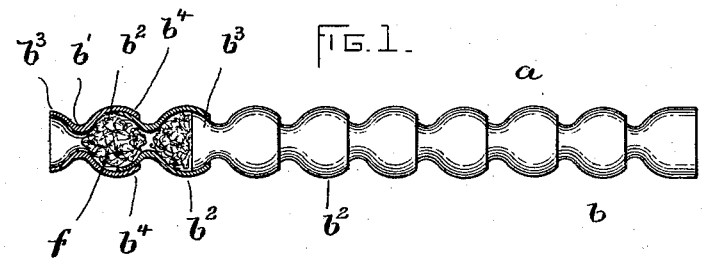
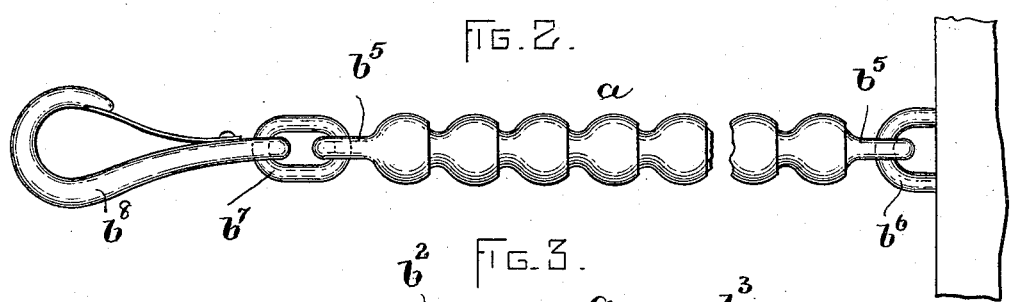
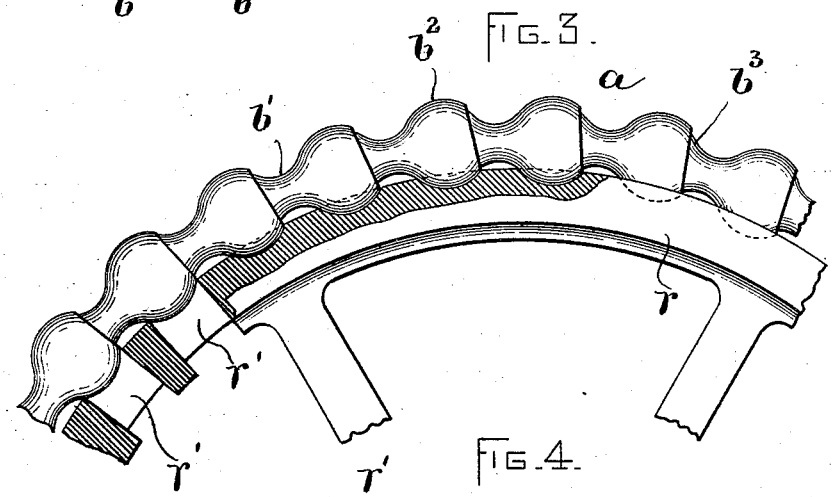
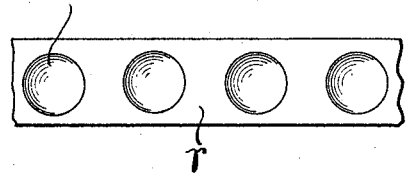
WITNESSES:
E. Batchelder
A. D. Adams
INVENTOR:
G. L. Reenstierna
by Wright Brown & Quinby
Attys.

UNITED STATES PATENT OFFICE.

GUSTAF LIBERT REENSTIERNA, OF BOSTON, MASSACHUSETTS, ASSIGNOR TO THEOPHILUS KING, TRUSTEE, OF SAME PLACE.

CHAIN.

SPECIFICATION forming part of Letters Patent No. 566,095, dated August 18, 1896.

Application filed December 30, 1895. Serial No. 573,703. (No model.)

*To all whom it may concern:*

Be it known that I, GUSTAF LIBERT REENSTIERNA, of Boston, in the county of Suffolk and State of Massachusetts, have invented certain new and useful Improvements in Chains, of which the following is a specification.

This invention relates to a new and useful improvement in chains; and it consists in the novel features of construction and relative arrangement of parts hereinafter fully described in the specification, clearly illustrated in the drawings, and particularly pointed out in the claims.

Reference is to be had to the accompanying sheet of drawings, forming a part of this application, in which like characters indicate like parts wherever they occur.

Figure 1 represents in front elevation a portion of a chain constructed in accordance with my invention, two of the links being shown in section in order to illustrate the construction and relative arrangement of the several parts of the link. Fig. 2 represents a front elevation of my improved chain arranged as a hitching device. Fig. 3 represents a front elevation of my improved chain used in place of a sprocket-chain. Fig. 4 represents a top plan view of a wheel to be used in connection with my improved chain when the latter is employed as a driver to take the place of a sprocket-chain.

My invention has in view a chain the links whereof are preferably made of sheet metal and so constructed and arranged that while they are prevented from being pulled apart or having more than the predetermined movement in the direction of the axis of their length, yet are free, not only to rotate on said axis, but also to assume any position desired at an angle to the normal axis of the chain. I am thus enabled to construct a chain that is cheap in manufacture, of practically any degree of strength, depending upon the kind and thickness of material employed, and, furthermore, a chain that is entirely flexible, that can be tied almost as readily as a rope. Furthermore, the links of the chain being free to rotate on their axes, the wear between the complemental parts of the several links is made uniform, instead of taking place at one point.

A chain constructed in accordance with my invention may be put to any desired use. It may be used as a driver, or as a hitching-chain; it may be used as a cord for ornamental purposes and for jewelry, or in any place where an article of this kind is desirable or necessary.

Referring now to Fig. 1, my improved chain $a$ is shown as made up of a series of links $b$. Each link consists of a neck portion $b'$, joining two bell-shaped members $b^2$ $b^3$. These links are struck up from suitable dies, of sheet metal, preferably. One of the members, here shown as the member $b^2$, is of greater diameter and longer than the member $b^3$, and in assembling the links the member $b^3$ is inserted in the mouth of the member $b^2$. Then by any suitable tool the material about the mouth of the member $b^2$ is spun or pressed down close and made to conform to the sides of the member $b^3$, constituting a confining flange or lip $b^4$, and the links being struck up out of sheet metal it follows that not only the head portion but the neck itself will be hollow, thereby affording the greatest strength for the amount of material employed, the latter being determined by the use to which the chain is to be put. The strain that the chain will bear is easily determined by ascertaining the amount of pressure required to force the flange $b^4$ down around the member $b^3$. For all practical purposes the strain that the chain will bear will be equal to the pressure required to perform this work.

When desired, the interior of the members $b^2$ $b^3$ may be filled with a sponge or other substance $f$, soaked in oil, thereby keeping the rubbing surfaces of the two members lubricated.

Considering the chain broadly and without reference to the particular use to which it is to be put, it will be observed that the several links are prevented from being pulled away from each other, or are confined to a limited movement in the direction of their axes, by reason of the confining-flange $b^4$; but owing to the shape of the members of the link and their arrangement the several links are free to rotate on their axes, and that, by reason of the member $b^3$ turning upon the member $b^2$, like a ball in a socket, any link can be made to assume any desired position at an angle to the general axis of the chain. By this construction I produce a chain that is flexible in any direction and that can be put to a variety of uses. When used as a hitching-chain, one of the members of the links at one end can be omitted or fashioned as a staple $b^5$ to take into a corresponding staple $b^6$, as shown in the construction in Fig. 2, while the member at the other end may be fashioned to engage a link $b^7$, carrying a snap-hook $b^8$.

Referring to Fig. 3, I have shown my improved chain applied as a driver, in which case the periphery of the wheel $r$ will be formed with a plurality of holes $r'$, the sides of which are engaged by the sides of the members $b^2$ of the chain, as shown. It frequently happens with sprocket-chains that the opening in the chain fails to strike the spur of the sprocket-wheel freely and misses or slips off. Such difficulty would not present itself when my chain is employed, since the portions of the link that engage the holes $r'$, being circular, will center themselves in the said holes, whether they strike squarely or on the edge thereof.

Having thus explained the nature of my invention and described a way of constructing and using the same, though without attempting to set forth all the forms in which it may be made or all of the modes of its use, what I claim, and desire to secure by Letters Patent, is—

1. A chain, comprising in its construction, a series of sheet-metal links, each link consisting of a neck joining two bell-shaped members that are circular in cross-section, a member of one link being arranged within the member of the adjacent link, and a confining-flange upon the outer member, for confining the inner member therein.

2. A chain, comprising in its construction, a series of sheet-metal links, each link consisting of a neck carrying a socket member at one end, a ball member at the other, each ball member being arranged within a socket member, a retaining-flange upon said socket member for rotatably confining the ball member therein, whereby each link is held from movement in the direction of the length of the chain, but is free to rotate on its axis, and to assume any angle to the axis of the chain.

In testimony whereof I have signed my name to this specification, in the presence of two subscribing witnesses, this 20th day of December, A. D. 1895.

GUSTAF LIBERT REENSTIERNA.

Witnesses:
　E. BATCHELDER,
　A. D. ADAMS.